US011919159B1

(12) United States Patent
Malik et al.

(10) Patent No.: US 11,919,159 B1
(45) Date of Patent: Mar. 5, 2024

(54) MULTIPURPOSE ROBOTIC GLOVE DESIGNED TO TEACH SIGN LANGUAGE THROUGH GUIDED MANUAL MOTIONS

(71) Applicants: Raaghav Malik, Galena, OH (US); Soham Joshi, Morrisville, NC (US)

(72) Inventors: Raaghav Malik, Galena, OH (US); Soham Joshi, Morrisville, NC (US)

( * ) Notice: Subject to any disclaimer, the term of this patent is extended or adjusted under 35 U.S.C. 154(b) by 0 days.

(21) Appl. No.: 18/165,529

(22) Filed: Feb. 7, 2023

(51) Int. Cl.
*G09B 21/04* (2006.01)
*B25J 9/00* (2006.01)
*B25J 9/10* (2006.01)

(52) U.S. Cl.
CPC .......... *B25J 9/104* (2013.01); *B25J 9/0006* (2013.01); *G09B 21/04* (2013.01)

(58) Field of Classification Search
CPC ........ B25J 9/0006; G09B 21/04; G09B 21/00; G09B 19/00; G09B 19/0038
See application file for complete search history.

(56) References Cited

U.S. PATENT DOCUMENTS

| 4,414,537 A * | 11/1983 | Grimes ................ G09B 21/009 400/479.2 |
| 7,565,295 B1 * | 7/2009 | Hernandez-Rebollar .................... G09B 21/009 704/271 |
| 9,342,151 B2 * | 5/2016 | Gu .......................... G06F 3/016 |
| 11,009,959 B1 | 5/2021 | Piazza et al. |
| 2020/0375287 A1 * | 12/2020 | Ben-Tzvi ................ G06F 3/014 |
| 2022/0350410 A1 * | 11/2022 | Salada ..................... G06F 1/263 |

FOREIGN PATENT DOCUMENTS

DE 0743619 * 11/1996 ........... G09B 21/009

OTHER PUBLICATIONS

H. Ishisaki, K. Tabata, T. Tsuji and T. Watanabe, "Hand Grasping Assist Glove Combining Exoskeleton Structure and Pneumatically Driven Actuator," 2023 IEEE/SICE International Symposium on System Integration (SII), Atlanta, GA, USA, 2023, pp. 1-5, (Year: 2023).*

(Continued)

*Primary Examiner* — Robert J Utama
(74) *Attorney, Agent, or Firm* — Wilmer Cutler Pickering Hale and Dorr LLP

(57) ABSTRACT

A wearable device is disclosed. The wearable device comprises a glove, fingers, and one or more finger band cable guides connected to each of the fingers. A servo mount is coupled to the glove and a plurality of extension and flexion servo motors are coupled to the servo mount. A plurality of flexion cables and a plurality of extension cables are coupled to the plurality of extension and flexion servo motors and the fingers. An abduction and adduction servo motor is coupled to an abduction and adduction servo motor mount coupled to the glove. A controller actuates the plurality of extension and flexion servo motors and the abduction and adduction servo motor to move the finger portions. The wearable device further comprises a gyroscope to measure wrist movement and at least one vibration motor to provide haptic feedback to a wearer.

10 Claims, 8 Drawing Sheets

(56) References Cited

OTHER PUBLICATIONS

S. Johnson, G. Gao, T. Johnson, M. Liarokapis and C. Bellini, "An Adaptive, Affordable, Open-Source Robotic Hand for Deaf and Deaf-Blind Communication Using Tactile American Sign Language," 2021 43rd Annual International Conference of the IEEE Engineering (EMBC), Mexico, (Year: 2021).*

D. Popov, I. Gaponov and J.-H. Ryu, "Portable Exoskeleton Glove With Soft Structure for Hand Assistance in Activities of Daily Living," in IEEE/ASME Transactions on Mechatronics, vol. 22, No. 2, pp. 865-875, Apr. 2017, (Year: 2017).*

"Deaf-Blind Solutions", Freedom Scientific, https://support.freedomscientific.com/products/blindness/interpretype, accessed Apr. 27, 2023 (2 pages).

"UW undergraduate team wins $10,000 Lemelson-MIT Student Prize for gloves that translate sign language", University of Washington, https://www.washington.edu/news/2016/04/12/uw-undergraduate-team-wins-10000-lemelson-mit-student-prize-for-gloves-that-translate-sign-language/, Apr. 12, 2016, accessed Apr. 27, 2023 (6 pages).

Ahmed, et al., "A Review of Systems-Based Sensory Gloves for Sign Language Recognition State of the Art between 2007 and 2017", Sensors, 18:2208, doi: 10.3390/s18072208, Jul. 9, 2018 (44 pages).

Irving, "3D-printable robot arm is a sign language interpreter", New Atlas, https://newatlas.com/aslan-sign-language-robot-arm/50951/, Aug. 18, 2017, accessed Apr. 27, 2023 (11 pages).

Mason, "Deaf-Blind Communication technology", https://nfb.org/sites/default/files/images/nfb/publications/bm/bm14/bm1409/bm140906.htm, Braille Monitor, Oct. 2014, accessed Apr. 27, 2023 (11 pages).

MediaPipe Solutions guide, Google Developers, <https://developers.google.com/mediapipe/solutions/guide#get_started>, accessed Apr. 27, 2023 (4 pages).

Robertson, "HaptX says Meta copied its patented design for haptic glove / The haptics veteran is seeking an 'equitable arrangement'", https://www.theverge.com/2021/11/17/22788052/haptx-haptic-glove-design-meta-facebook-patent-infringement-allegation, The Verge, Nov. 17, 2021 (5 pages).

Robertson, "Teslasuit's new VR gloves let you feel virtual objects and track your pulse", https://theverge.com/2019/12/26/21037855/teslasuit-glove-vr-haptic-feedback-glove-announce-pricing-release-date-ces-2020, The Verge, Dec. 26, 2019 (5 pages).

Van Staden, "An evaluation of an intervention using sign language and multi-sensory coding to support world learning and reading comprehension of deaf signing children", Child Language Teaching and Therapy, 29(3):305-318, Oct. 2013 (15 pages).

* cited by examiner

MULTIPURPOSE ROBOTIC GLOVE DESIGNED TO TEACH SIGN LANGUAGE THROUGH GUIDED MANUAL MOTIONS

TECHNICAL FIELD

The present disclosure relates to a multipurpose robotic glove, and more particularly to a robotic glove that can control a position of a hand that the robotic glove is worn on.

BACKGROUND

Approximately 750 million people are affected by some form of visual or hearing impairment. This population is expected to double within the next 50 years, and by 2050, it is estimated that one in every ten people will have disabling hearing loss. These estimates make it clear that visual and auditory impairment is a major concern in the near future.

Currently, there is limited support for deafblind individuals because of their limited sensory access to the world and challenges arising from communication with deafblind individuals. Current solutions used by deafblind individuals for communication include external communication devices, such as Braille readers and writers, and support service professionals who are trained in pro-tactile sign language. However, such solutions are quite limited— approximately 15% of the deafblind population use Braille readers and writers, and 4% to 6% of the 500 million deaf and deafblind individuals use support service providers, due to the high cost and high demand of these providers in the world today. Such limitations are especially pronounced in developing countries.

As of 2007, over 90% of the visually impaired population resides in developing countries, and 63% to 73% of funds spent towards deaf-assistive technology and education are spent in low-income countries. Still, 60% of the deafblind population and 96% of the deaf population are without support. The majority of deafblind individuals who cannot afford either of these solutions rely on low-cost communication cards, which are cards with words and phrases written on them. This leads to a dependence on others and limited functionality. Existing products and systems for facilitating communication with deafblind individuals are inadequate because they are not portable, not readily accessible, are of limited functionality, or are prohibitively expensive.

For example, some products have limited functionality. Communication cards, for example, only contain prescribed messages and therefore can only be used in particular scenarios, and can easily become torn or lost. Additionally, some Braille-to-text communication devices require dependence on a laptop computer for use and are not easily portable. While some glove-based products do currently exist, they can determine the position or pose of the glove. Some existing glove devices can determine the position or pose of the glove but are designed to translate sign language for non-deafblind users to understand and do not aid deafblind users. Such glove devices do not provide feedback to a person wearing the glove to help deafblind wearers evaluate how well they are performing an activity with the glove. Other glove devices with limited functionality may be able to provide feedback to the person wearing the glove but lack the precision required to help deafblind wearers communicate.

There are also glove devices that are prohibitively expensive. For example, some glove devices use complex and expensive microfluidic systems as the mechanism to affect the glove's position or pose. Other gloves use expensive electrodes to simulate the sensation of touching a surface. Further, most Braille readers and writers cost thousands of dollars, which is a primary reason most deafblind individuals worldwide do not have access to such devices.

There is a clear and rapidly emerging need for an alternative to communicator devices and specialists. What is needed is a more accessible and low-cost product that can teach users sign language with personalized feedback.

SUMMARY

A wearable glove device is disclosed. In one embodiment, the wearable glove devices comprises a glove portion comprising a palm side, a dorsal side, a cuff, a plurality of finger portions comprising a thumb portion, an index finger portion, a middle finger portion, a ring finger portion, and a pinky finger portion, one or more finger band cable guides connected to each of the thumb portion, the index finger portion, the middle finger portion, the ring finger portion, and the pinky finger portion; and a palm cable guide disposed across the palm side of the glove portion. The wearable glove device can further comprise a sleeve coupled to the cuff of the glove portion. The wearable glove device can further comprise a servo mount coupled to the sleeve, the servo mount having an arm cable guide and a wrist cable guide. The wearable glove device can further comprise a plurality of extension and flexion servo motors coupled to the servo mount, the plurality of extension and flexion servo motors comprising a thumb servo motor, an index finger servo motor, a middle finger servo motor, a ring finger servo motor, and a pinky finger servo motor. The wearable glove device can further comprise a first flexion cable coupled between the thumb portion and the thumb servo motor, a second flexion cable coupled between the index finger portion and the index finger servo motor, a third flexion cable coupled between the middle finger portion and the middle finger servo motor, a fourth flexion cable coupled between the ring finger portion and the ring finger servo motor, and a fifth flexion cable coupled between the pinky finger portion and the pinky finger servo motor. The wearable glove device can further comprise a plurality of extension cables, the plurality of extension cables each having a first end coupled to a respective servo motor and a second end coupled to a respective finger band cable guide located at a distal end of each of the plurality of finger portions on the dorsal side of the glove portion. The wearable glove device can further comprise an abduction and adduction servo motor coupled to an abduction and adduction servo motor mount coupled to the dorsal side of the glove portion, and the abduction and adduction servo motor configured to abduct and adduct the thumb portion. The wearable glove device can further comprise an abduction and adduction actuating arm coupled to the abduction and adduction servo motor and coupled to the thumb portion. The wearable glove device can further comprise a controller coupled to the plurality of extension and flexion servo motors and the abduction and adduction servo motor, configured to actuate the plurality of extension and flexion servo motors and the abduction and adduction servo motor to move the plurality of finger portions. The wearable glove device can further comprise a gyroscope disposed on the glove portion at the base of the glove portion, wherein the gyroscope is configured to measure a wrist supination and a wrist pronation. The wearable glove device can further comprise at least one vibration motor disposed on the sleeve, wherein the at least one vibration motor is configured to vibrate responsive to the wrist supination and pronation.

According to other aspects of this embodiment, the thumb flexion cable is threaded through the arm cable guide, the wrist cable guide, the palm cable guide, and is coupled to at least one finger band cable guide on the thumb portion, the index finger flexion cable is threaded through the arm cable guide, the wrist cable guide, the palm cable guide, and is coupled to at least one finger band cable guide on the index finger portion, the middle finger flexion cable is threaded through the arm cable guide, the wrist cable guide, the palm cable guide, and is coupled at least one finger band cable guide on the middle finger portion, the ring finger flexion cable is threaded through the arm cable guide, the wrist cable guide, the palm cable guide, and is coupled at least one finger band cable guide on the ring finger portion, and the pinky finger flexion cable is threaded through the arm cable guide, the wrist cable guide, the palm cable guide, and is coupled at least one finger band cable guide on the pinky finger portion.

According to other aspects of this embodiment, the plurality of extension cables can further comprise a thumb extension cable threaded through the arm cable guide, the wrist cable guide, the palm cable guide, and is coupled to at least one finger band cable guide on the thumb portion, an index finger extension cable threaded through the arm cable guide, the wrist cable guide, the palm cable guide, and is coupled to at least one finger band cable guide on the index finger portion, a middle finger extension cable threaded through the arm cable guide, the wrist cable guide, the palm cable guide, and is coupled to at least one finger band cable guide on the middle finger portion, a ring finger extension cable threaded through the arm cable guide, the wrist cable guide, the palm cable guide, and is coupled to at least one finger band cable guide on the ring finger portion, and a pinky finger extension cable threaded through the arm cable guide, the wrist cable guide, the palm cable guide, and is coupled to at least one finger band cable guide on the pinky finger portion.

According to other aspects of this embodiment, the wearable glove device can further comprise an actuation gear rotatably coupled to the abduction and adduction servo motor, the actuation gear having a first axis of rotation, and a thumb gear rotatably coupled to the abduction and adduction servo motor mount, the thumb gear having a second axis of rotation that is not parallel to the first axis of rotation, wherein the abduction and adduction actuating arm is coupled to the thumb gear and is orthogonal to the second axis of rotation, and the abduction and adduction actuating arm is coupled to the one or more finger band cable guides connected to the thumb portion. According to other aspects of this embodiment, the teeth of the actuation gear interface with teeth of the thumb gear such that rotation of the actuation gear along the first axis of rotation causes the thumb gear to rotate along the second axis of rotation. According to other aspects of this embodiment, the teeth of the actuation gear are located on a frustoconical portion of the actuation gear.

According to other aspects of this embodiment, the one or more finger band cable guides comprise a ring having an opening configured to fit around a finger. According to other aspects of this embodiment, the one or more finger band cable guides further comprise a first eyelet and a second eyelet coupled to a circumference of the ring. According to other aspects of this embodiment, the first eyelet and the second eyelet are disposed on a line that crosses a center of the ring.

According to other aspects of this embodiment, rotation of the plurality of extension and flexion servo motors causes the plurality of extension cables to wind up when the rotation is in a first direction and to unwind when the rotation is in a second direction.

In another embodiment, a method for controlling a wearable glove device is disclosed. The method comprises receiving an image of a hand and determining a plurality of keypoints associated with a hand position depicted in the image of the hand. The method further comprises transforming the plurality of keypoints into a reference control signal comprising a signal for a plurality of servo motors and at least one vibration motor. The method further comprises associating the reference control signal with the hand position depicted in the image of the hand. The method further comprises storing the reference control signal associated with the hand position in a control signal library, the control signal library comprising a plurality of stored reference control signals. The method further comprises determining a desired hand position and identifying one of the plurality of stored reference control signals from the control signal library which corresponds to the desired hand position. The method further comprises applying the one of the plurality of stored reference control signals to the plurality of servo motors to control motion of the wearable glove device. The method further comprises applying the reference control signal to the at least one vibration motor to control vibration of the at least vibration motor.

According to other aspects of this embodiment, the plurality of keypoints are associated with locations of joints of fingers of the hand. According to the other aspects of this embodiment, transforming the plurality of keypoints into a reference control signal comprises determining a desired angle for one or more keypoints for one or more fingers of the hand. According to other aspects of this embodiment, determining a desired angle for one or more keypoints comprises determining a dot product between a first vector pointing away from the one or more keypoints and a second vector pointing away from the one or more keypoints. According to other aspects of this embodiment, the method can further comprise determining a total angle for the one or more fingers by summing desired angles for the one or more keypoints.

According to other aspects of this embodiment, the method can further comprise applying the reference control signal to the at least one vibration motor to control vibration of the at least vibration motor further comprises applying an increasingly stronger reference control signal as the hand conforms to the desired hand position. According to other aspects of this embodiment, the increasingly stronger reference control signal causes the vibration motor to increase a vibration frequency.

According to other aspects of this embodiment, the method can further comprise providing auditory feedback identifying the desired hand position to a wearer of the wearable glove device.

According to other aspects of this embodiment, the method can further comprise providing visual feedback identifying the desired hand position to a wearer of the wearable glove device.

According to other aspects of this embodiment, the wearable glove device is controlled to form a sign language symbol.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

It is to be understood that the phraseology and terminology employed herein are for the purpose of description and should not be regarded as limiting.

In some embodiments, the invention provides a wearable robotic glove having a plurality of servo motors to control a position of individual fingers of the wearable robotic glove. In some embodiments, a plurality of cables are coupled at one end to the plurality of servo motors and at another end to fingers of the wearable robotic glove such that rotation of the servo motors changes the lengths of the plurality of cables to control flexion and extension of the individual fingers of the wearable robotic glove. In some embodiments, a technique is provided for controlling the wearable robotic glove based on a control signal derived from an image of a hand.

Figure 1:
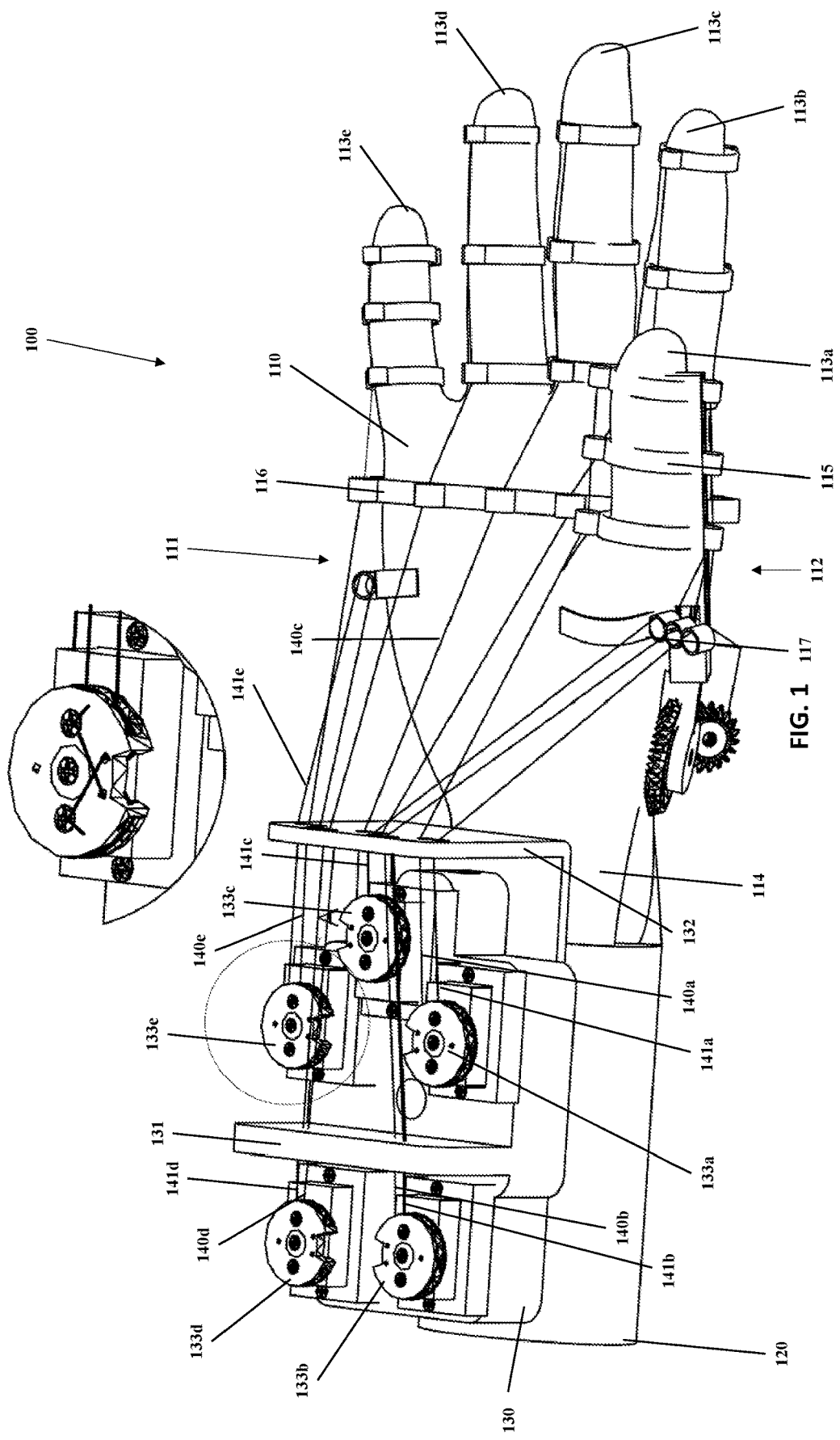
FIG. 1 is a perspective view showing a glove device, according to some embodiments.

FIG. 1 shows a perspective view of a glove device 100, according to some embodiments. In some embodiments, the glove device 100 includes a glove portion 110 and an arm sleeve 120. The glove portion 110 and arm sleeve 120 can be separate components in some embodiments. The glove portion 110 and arm sleeve 120 can also be a unitary component in some embodiments. The glove portion 110 and arm sleeve 120 can each be made of a material that is suitable for being worn on a person's hand and arm. For example, such materials include thermoplastic polyurethane (TPU), rubber, nylon, fabric or other similar materials that are comfortable for being worn on a person's hand and arm.

The glove portion 110 can include a palm side 111, a dorsal side 112, a thumb portion 113a, an index finger portion 113b, a middle finger portion 113c, a ring finger portion 113d, a pinky finger portion 113e, and a cuff 114.

Each of the thumb portion 113a, the index finger portion 113b, the middle finger portion 113c, the ring finger portion 113d, and the pinky finger portion 113e can each have coupled thereon at least one finger band cable guide 115. In some embodiments, the finger band cable guide 115 can be a ring that fits around a finger. In some embodiments, the finger band cable guide 115 has a first eyelet located at a perimeter of the finger band cable guide 115 and a second eyelet located opposite the first eyelet and at the perimeter of the finger band cable guide 115. In some embodiments, the first eyelet is located on the palm side 111 of a respective finger and the second eyelet is located on the dorsal side 112 of the respective finger. The finger band cable guide 115 can be made of a material suitable for wearing on a person's finger. For example, the finger band cable guide can be made of plastic, metal, wood, or other similar materials that are comfortable for being worn on a person's fingers. In some embodiments, each finger can have coupled thereon three finger band cable guides 115.

In some embodiments, the glove portion 110 can also include a palm cable guide 116 that encircles the glove portion 110. The palm cable guide 116 can be a band that encircles the glove portion 110 in some embodiments. The palm cable guide 116 can include at least one eyelet disposed on the palm side 111 of the palm cable guide 116 and at least one eyelet disposed on the dorsal side 112 of the palm cable guide 116 in some embodiments. In some embodiments, the palm cable guide 116 can include four eyelets disposed on the palm side 111 of the palm cable guide 116 and four eyelets disposed on the dorsal side 112 of the palm cable guide 116. The eyelets of the palm cable guide 116 can be aligned with the eyelets on the finger band cable guides 115 in some embodiments. The palm cable guide 116 can be made of a material suitable for wearing on a person's finger, such as plastic, metal, wood, or other similar materials that are comfortable for being worn on a person's fingers.

In some embodiments, the glove portion 110 is coupled to the arm sleeve 120 at the cuff 114. For example, the coupling of the glove portion 110 to the arm sleeve 120 can be accomplished by sewing together the glove portion 110 and arm sleeve 120, with a zipper that zips the glove portion 110 and arm sleeve 120 together, with at least one button that buttons the glove portion 110 and arm sleeve 120 together, or with hook and loop fasteners in some embodiments.

In some embodiments, the arm sleeve 120 can have a servo mount 130 mounted thereon. The servo mount 130 provides a platform for mounting servo motors. In some embodiments, an arm cable guide 131 and a wrist cable guide 132 can extend perpendicularly from the servo mount 130. In some embodiments, the wrist cable guide 132 can be located adjacent to the cuff 114 of the glove portion 110. The arm cable guide 131 can be located at a midpoint of the servo mount 130 in some embodiments. The arm cable guide 131 and wrist cable guide 132, in some embodiments, can be walls having at least one aperture. The arm cable guide 131 and wrist cable guide 132 can guide cables for controlling a position of each of the thumb portion 113a, the index finger portion 113b, the middle finger portion 113c, the ring finger portion 113d, and the pinky finger portion 113e.

The servo mount 130 can have at least one servo motor mounted thereon in some embodiments. In some embodiments, a thumb servo 133a, an index finger servo 133b, a middle finger servo 133c, a ring finger servo 133d, and a pinky finger servo 133e can be mounted on the servo mount 130. In some embodiments, the thumb servo 133a, the middle finger servo 133c, and the pinky finger server 133e can be mounted on the servo mount 130 closer to the cuff 114 of the glove portion 110 than the index finger servo 133b and ring finger servo 133d are mounted on the servo mount 130. In some embodiments, the thumb servo 133a, the middle finger servo 133c, and the pinky finger server 133e can be mounted on the servo mount 130 in a triangular configuration with the middle finger servo 133c mounted closest to the cuff 114.

In some embodiments, a thumb flexion cable 140a can be coupled at a first end to the thumb servo 133a and coupled at a second end to the first eyelet on the palm side 111 of the finger band cable guide 115 located at a distal end of the thumb portion 113a. The thumb flexion cable 140a can be threaded through the wrist cable guide 132, through a thumb base cable guide 117 located at a base of the thumb portion 113a, and through at least one finger band cable guide 115 coupled to the thumb portion 113a in some embodiments. Similarly, a thumb extension cable 141a can be coupled at a first end to the thumb servo 133a and coupled at a second end to the second eyelet on the dorsal side 112 of the finger band cable guide 115 located at a distal end of the thumb portion 113a. The thumb extension cable 141a can be threaded through the wrist cable guide 132, through a thumb base cable guide 117 located at a base of the thumb portion 113a, and through at least one finger band cable guide 115 coupled to the thumb portion 113a in some embodiments.

In some embodiments, an index finger flexion cable 140b can be coupled at a first end to the index finger servo 133b and coupled at a second end to the first eyelet on the palm side 111 of the finger band cable guide 115 located at a distal end of the index finger portion 113b. The index finger flexion cable 140b can be threaded through the arm cable guide 131, wrist cable guide 132, an eyelet of the palm cable guide 116 on the palm side 111, and through at least one finger band cable guide 115 coupled to the index finger portion 113b. Similarly, an index finger extension cable 141b can be coupled at a first end to the index finger servo 133b and coupled at a second end to the second eyelet on the dorsal side 112 of the finger band cable guide 115 located at a distal end of the index finger portion 113b. The index finger extension cable 141b can be threaded through the arm cable guide 131, wrist cable guide 132, an eyelet of the palm cable guide 116 on the dorsal side 112, and through at least one finger band cable guide 115 coupled to the index finger portion 113b in some embodiments.

In some embodiments, a middle finger flexion cable 140c can be coupled at a first end to the middle finger servo 133c and coupled at a second end to the first eyelet on the palm side 111 of the finger band cable guide 115 located at a distal end of the middle finger portion 113c. The middle finger flexion cable 140c can be threaded through the wrist cable guide 132, an eyelet of the palm cable guide 116 on the palm side 111, and through at least one finger band cable guide 115 coupled to the middle finger portion 113c. Similarly, a middle finger extension cable 141c can be coupled at a first end to the middle finger servo 133c and coupled at a second end to the second eyelet on the dorsal side 112 of the finger band cable guide 115 located at a distal end of the middle finger portion 113c. The middle finger extension cable 141c can be threaded through the wrist cable guide 132, an eyelet of the palm cable guide 116 on the palm side 111, and through at least one finger band cable guide 115 coupled to the middle finger portion 113c in some embodiments.

In some embodiments, a ring finger flexion cable 140d can be coupled at a first end to the ring finger servo 133d and coupled at a second end to the first eyelet on the palm side 111 of the finger band cable guide 115 located at a distal end of the ring finger portion 113d. The ring finger flexion cable 140d can be threaded through the arm cable guide 131, wrist cable guide 132, an eyelet of the palm cable guide 116 on the palm side 111, and through at least one finger band cable guide 115 coupled to the ring finger portion 113d. Similarly, a ring finger extension cable 141d can be coupled at a first end to the ring finger servo 133d and coupled at a second end to the second eyelet on the dorsal side 112 of the finger band cable guide 115 located at a distal end of the ring finger portion 113d. The ring finger extension cable 141d can be threaded through the arm cable guide 131, wrist cable guide 132, an eyelet of the palm cable guide 116 on the dorsal side 112, and through at least one finger band cable guide 115 coupled to the ring finger portion 113d in some embodiments.

In some embodiments, a pinky finger flexion cable 140e can be coupled at a first end to the pinky finger servo 133e and coupled at a second end to the first eyelet on the palm side 111 of the finger band cable guide 115 located at a distal end of the pinky finger portion 113e. The middle finger flexion cable 140e can be threaded through the wrist cable guide 132, an eyelet of the palm cable guide 116 on the palm side 111, and through at least one finger band cable guide 115 coupled to the pinky finger portion 113e. Similarly, a pinky finger extension cable 141e can be coupled at a first end to the pinky finger servo 133e and coupled at a second end to the second eyelet on the dorsal side 112 of the finger band cable guide 115 located at a distal end of the pinky finger portion 113e. The pinky finger extension cable 141e can be threaded through the wrist cable guide 132, an eyelet of the palm cable guide 116 on the palm side 111, and through at least one finger band cable guide 115 coupled to the pinky finger portion 113e in some embodiments.

In some embodiments, each of the thumb servo 133a, the index finger servo 133b, the middle finger servo 133c, the ring finger servo 133d, and the pinky finger servo 133e can control the position of the respective thumb portion 113a, index finger portion 113b, middle finger portion 113c, ring finger portion 113d, and pinky finger portion 113e by rotating to change a length of the extension and flexion cables that couple the respective servo to the respective finger portion. For example, in some embodiments, a rotation of a servo in a first direction can cause a finger to flex by winding up a flexion cable as to decrease the flexion cable's length while letting out an extension cable as to increase the extension cable's length. Similarly, in some embodiments, a rotation of a servo in a second direction can cause a finger to extend by winding up an extension cable as to decrease the extension cable's length while letting out a flexion cable as to increase the flexion cable's length.

In some embodiments, a gyroscopic sensor can be coupled to the glove device 100. The gyroscopic sensor can be a mechanical gyroscopic sensor or a micro-electrical-mechanical-systems (MEMS) gyroscope, but a person of ordinary skill in the art will understand that other types of gyroscopic sensors can be used. The gyroscopic sensor can be coupled to the glove portion 110, arm sleeve 120, or servo mount 130 in some embodiments. The gyroscope can be configured to measure movements of the glove device 100 or the glove device 100 wearer's hand or wrist while wearing the glove device 100. In some embodiments, the gyroscopic sensor is configured to measure a wrist supination and a wrist pronation, but a person of ordinary skill in the art will understand that other hand or wrist movements can be measured.

In some embodiments, a vibration actuator can be coupled to the glove device 100. The vibration actuator can be a vibration motor or a linear resonant actuator, but a person of ordinary skill in the art will understand that other types of vibration actuators can be used. The vibration actuator can be coupled to the glove portion 110, arm sleeve 120, or servo mount 130 in some embodiments. The vibration actuator can be configured to provide haptic feedback to the glove device 100 wearer in some embodiments. Haptic feedback can convey information to the glove device 100's wearer by varying a frequency, amplitude, or vibration pattern of the vibration actuator's vibration. A person of ordinary skill in the art will understand that one or more of the vibration actuator's frequency, amplitude, or vibration pattern can be varied. In some embodiments, the vibration actuator can be configured to vibrate in response to the wearer's wrist supination and pronation. In some embodiments, the vibration actuator can be configured to vibrate in response to a position of one or more of the glove device 100 wearer's fingers. Such haptic feedback can be advantageous for individuals with impaired hearing or vision.

Figure 2:
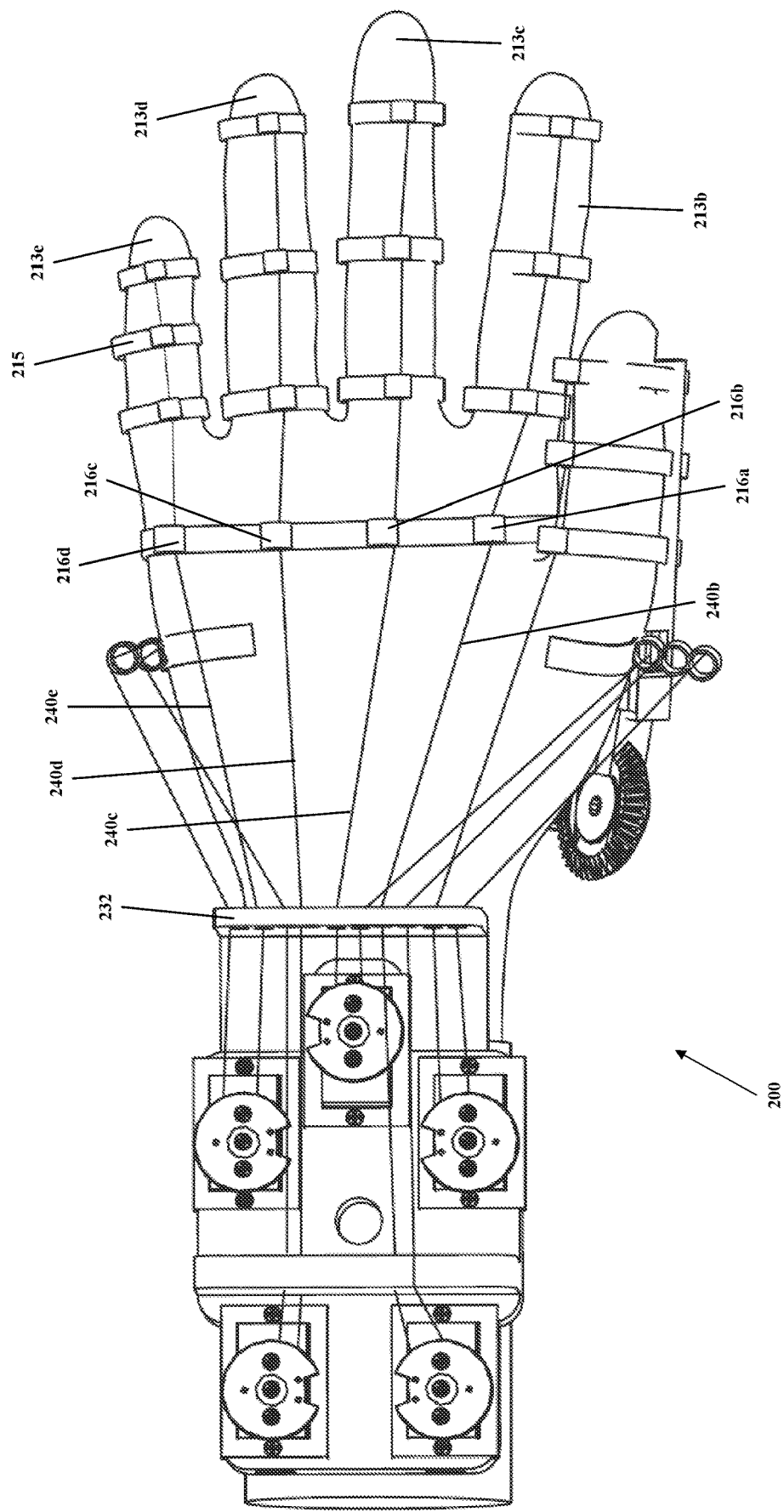
FIG. 2 is a perspective view showing a palm portion of a glove device, according to some embodiments.

FIG. 2 shows a perspective view of a glove device 200, according to some embodiments. In some embodiments, the palm cable guide 216 can have a first eyelet 216*a*, a second eyelet 216*b*, a third eyelet 216*c*, and a fourth eyelet 216*d*. The first eyelet 216*a*, the second eyelet 216*b*, the third eyelet 216*c*, and the fourth eyelet 216*d* can be located on a palm side 211 of the glove device 200 in some embodiments. The first eyelet 216*a* can be located beneath an index finger portion 213*b*, the second eyelet 216*b* can be located beneath a middle finger portion 213*c*, the third eyelet can be located beneath a ring finger portion 213*d*, and the fourth eyelet can be located beneath a pinky finger portion 213*e* in some embodiments.

An index finger flexion cable 240*b* can be threaded through a wrist cable guide 232, the first eyelet 216*a*, and a finger band cable guide 215 located on the index finger portion 213*b* in some embodiments. A middle finger flexion cable 240*c* can be threaded through the wrist cable guide 232, the second eyelet 216*b*, and a finger band cable guide 215 located on the middle finger portion 213*c* in some embodiments. A ring finger flexion cable 240*d* can be threaded through the wrist cable guide 232, the third eyelet 216*c*, and a finger band cable guide 215 located on the ring finger portion 213*d* in some embodiments. A pinky finger flexion cable 240*e* can be threaded through the wrist cable guide 232, the fourth eyelet 216*d*, and a finger band cable guide 215 located on the pinky finger portion 213*e* in some embodiments.

Figure 3:
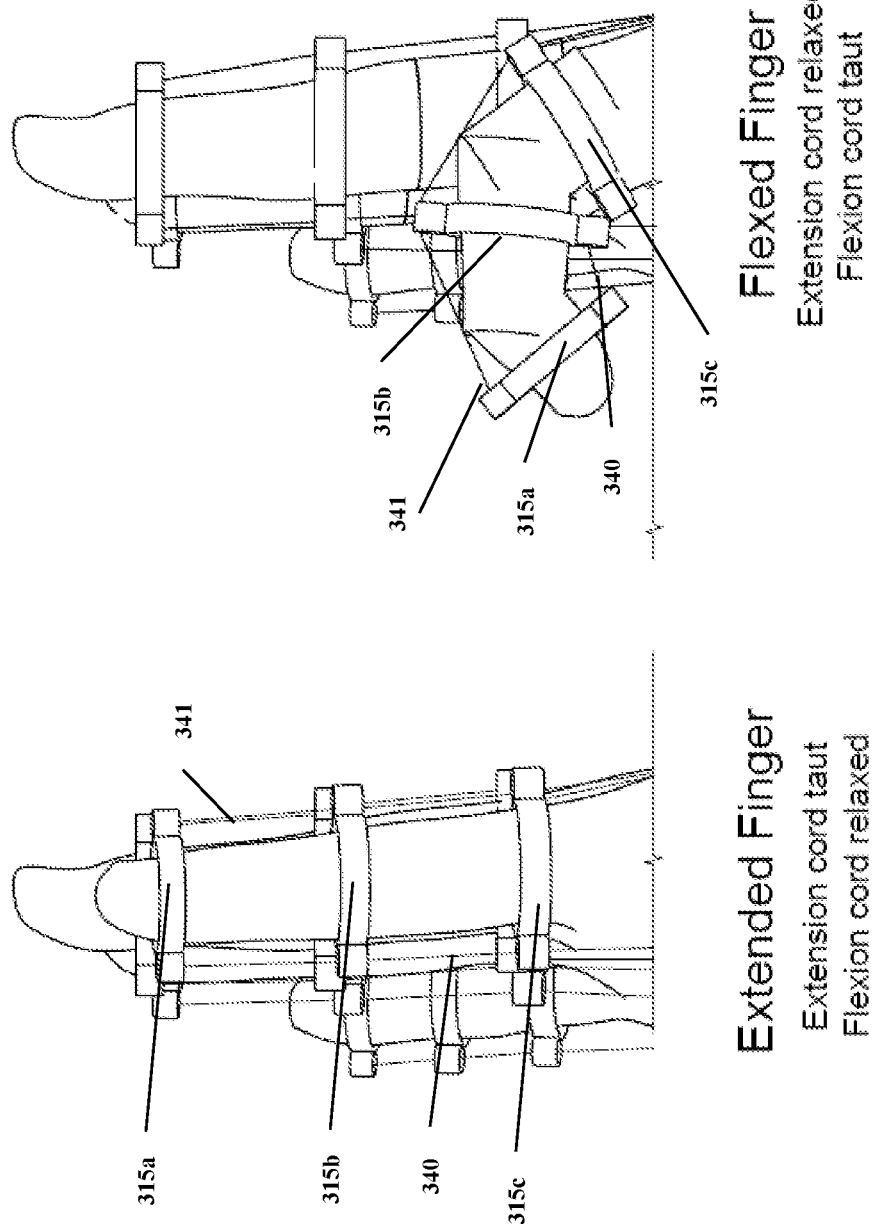
FIG. 3 is a perspective view showing an extension and a flexion of a pointer finger, according to some embodiments.

FIG. 3 illustrates a perspective view showing an extension and a flexion of an index finger, according to some embodiments. An extension cable 341 and a flexion cable 340 can be threaded through opposite sides of finger band cable guides 315*a*, 315*b*, 315*c* and palm cable guide in some embodiments. The extension 341 and flexion 340 cable can be coupled to one or a plurality of finger band cable guides according to some embodiments.

The index finger can be extended, according to some embodiments, by pulling the extension cable 341 towards the glove device wearer's wrist while the flexion cable 340 is released. Such an embodiment is illustrated by the "Extended Finger" portion of FIG. 3. The index finger can be flexed, according to some embodiments, by pulling the flexion cable 340 towards the glove device wearer's wrist while the extension cable 341 is released. Such an embodiment is illustrated by the "Flexed Finger" portion of FIG. 3. In some embodiments, a similar technique of pulling and releasing the flexion and extension cables can be applied to other fingers of the glove device as to affect the other fingers' positions.

Figure 4:
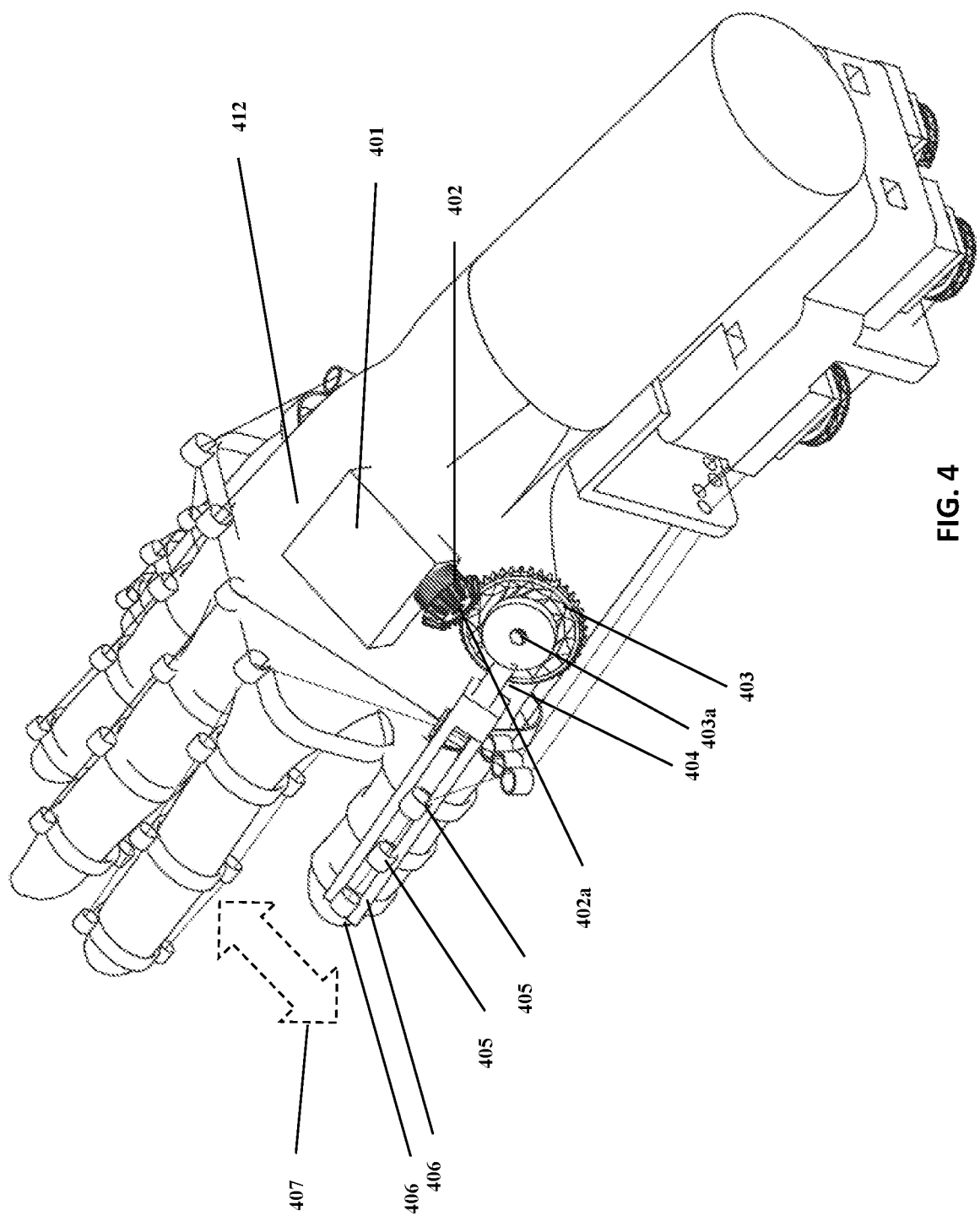
FIG. 4 is a perspective view showing a mechanism for abducting and adducting a thumb, according to some embodiments.

FIG. 4 is a perspective view showing a mechanism for abducting and adducting a thumb, according to some embodiments. In some embodiments, an abduction and adduction servo motor 401 can be coupled to an abduction and adduction servo motor mount located on a dorsal side 412 of the glove device at the device wearer's wrist. An abduction and adduction actuating gear 402 can be rotatably coupled to the abduction and adduction servo motor 401 in some embodiments. The abduction and adduction actuating gear 402 can have an axis of rotation 402*a* that runs through the center of abduction and adduction actuating gear 402. In some embodiments, the abduction and adduction actuating gear 402 has a frustoconical portion. In some embodiments, the abduction and adduction actuating gear 402 meshes with a thumb gear 403 located at the base of the device wearer's thumb. Thumb gear 403 can have an axis of rotation 403*a* that runs through the center of thumb gear 403. Thumb gear 403 can be rotatably coupled to the abduction and adduction servo motor mount. In some embodiments, axes of rotation 402*a* and 403*a* are substantially orthogonal to one another such that the axes of rotation 402*a* and 403*a* are not parallel to each other. In some embodiments, a thumb actuation arm 404 is coupled to the thumb gear 403. The thumb actuation arm 404 extends orthogonally to the axis of rotation 403*a* in some embodiments. The thumb actuation arm 404 can be coupled to cable guides 405 located on the thumb portion 406 in some embodiments.

As illustrated in FIG. 4, actuation of the abduction and adduction servo motor 401 causes rotation of the abduction and adduction actuating gear 402 which can further cause thumb gear 403 and actuation arm 404 to rotate. Such actuation of the motor 401 can apply a force to move the thumb 406 in an abducting and adducting path as indicated by arrow 407 to affect the position of the thumb in some embodiments. The abduction and adduction actuating arm 404 can cause the thumb to move towards the index finger to cause adduction in some embodiments. The abduction and adduction actuating arm 404 can cause the thumb to move away from the index finger to cause abduction in some embodiments.

Figure 5:
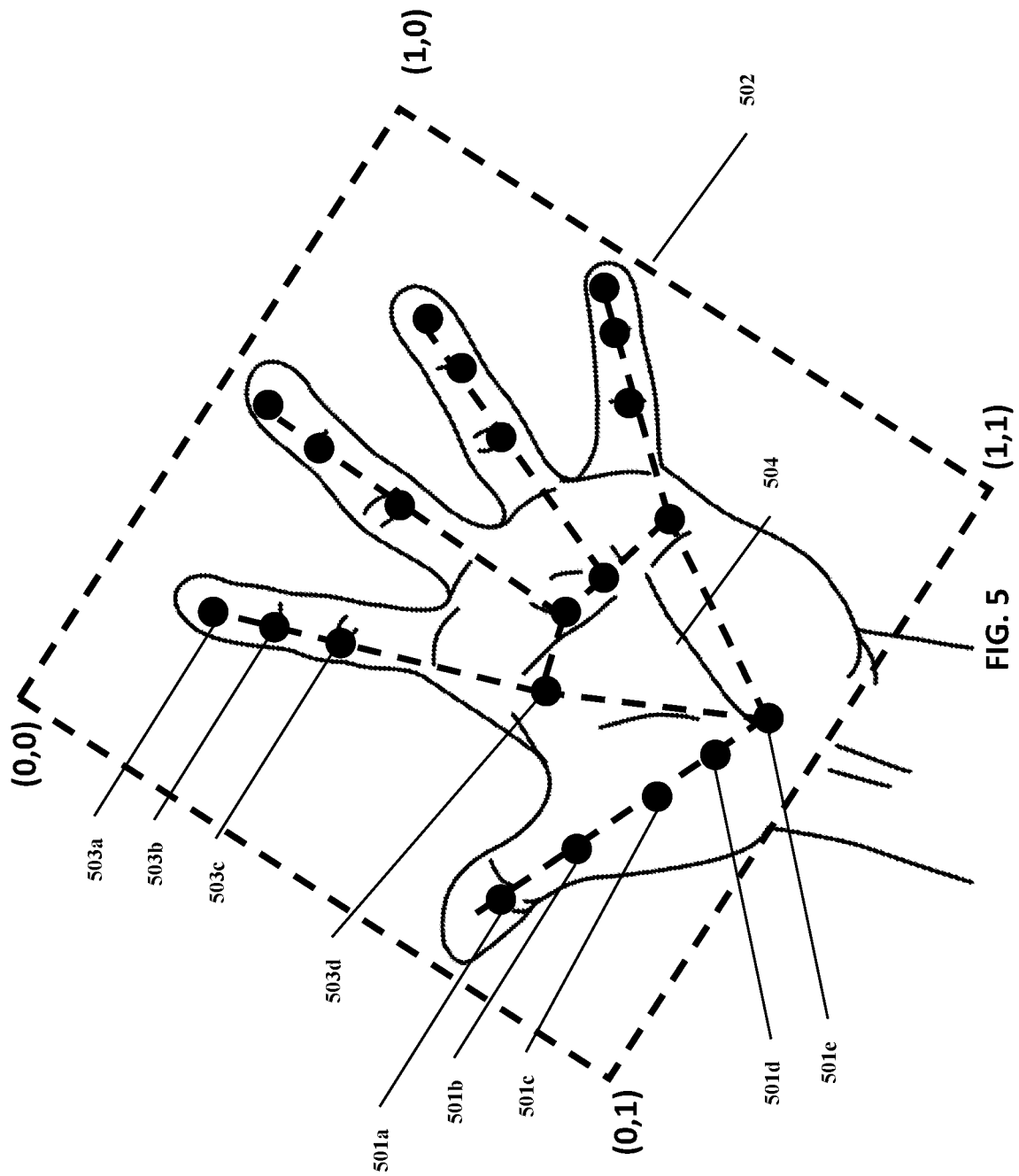
FIG. 5 is perspective view of a technique for tracking a hand position, according to some embodiments.

FIG. 5 illustrates part of a technique for tracking a hand position, according to some embodiments. In some embodiments, a keypoint-algorithm can be used to generate keypoints 501*a*, 501*b*, 501*c*, 501*d*, 501*e*, 503*a*, 503*b*, 503*c*, and 503 on an image of a hand. For example, in some embodiments the Google MediaPipe open-source framework can be used to analyze video frames to generate keypoints for a hand. The number of keypoints to be generated can be varied in some embodiments depending on a desired resolution for tracking a position of a hand and its fingers. FIG. 5 illustrates that twenty-one keypoints can be used in some embodiments.

A normalized bounding box 502 can be centered around the palm 503 of the hand in an image in some embodiments. In such embodiments, the bounding box 502 can provide coordinates for the keypoints. For example, (1, 1) can be the normalized bounding box 502 bottom left coordinate and (0, 0) can be the normalized bounding box 502 top right coordinate in some embodiments.

In some embodiments, keypoint coordinates can be used to calculate various flexion and abduction angles for fingers. For example, angles for each joint of a finger can be found and added together for an entire finger to determine a flexion or extension angle for a finger in some embodiments. For example, to find the angle of rotation of the joint located at keypoint 503*b* on the index finger, a vector pointing from keypoint 503*b* to key 503*a* joint and the vector pointing from keypoint 503*b* to keypoint 503*c* can be found. In some embodiments, the dot product formula can be used to determine the angle of rotation of the joint at keypoint 503*b*, where a and b are the two vectors:

$$\theta = \cos^{-1} \frac{a \cdot b}{|a| \times |b|}$$

In some embodiments, the total flexion or extension angle of the finger can be calculated by summing all of the angles of rotation of each joint on a finger. A similar process can be used to find total angles of flexion, extension, adduction, or abduction for other fingers.

Figure 6:
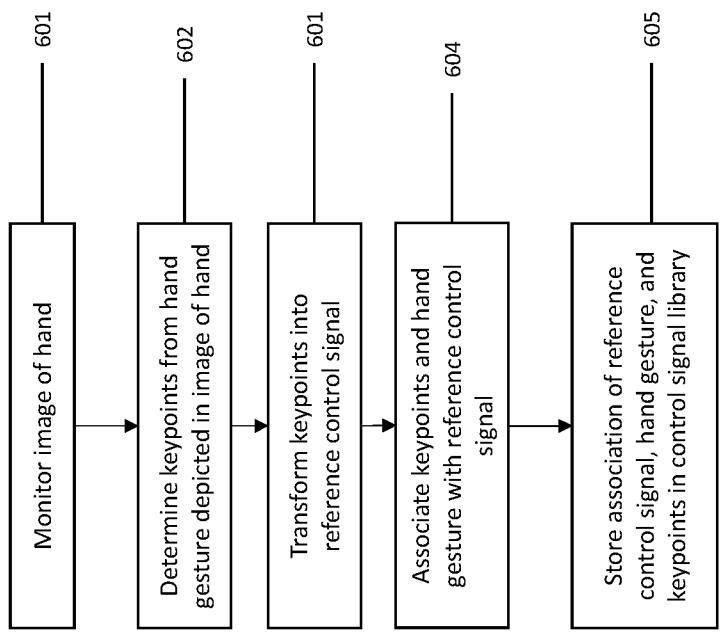
FIG. 6 is an illustration of an example method for calibrating a glove device, according to some embodiments.

FIG. 6 illustrates an example method that can be used to calibrate the glove device discussed throughout this disclosure. Such a method can be useful for initially setting up the glove device to teach a wearer of the glove device particular hand gestures. For example, a particular hand gesture can be a sign language gesture that represents a letter or word. The example method involves generating a signal that can be used to control servo motors to affect the position of a wearer's hand.

At step 601, an image of a hand is monitored. Such an image of the hand can be captured with an image capture device, such as a camera capturing still images or video images. The image of the hand can depict a hand gesture that corresponds to a letter or word in sign language. At step 602, the example method involves determining keypoints from the hand gesture depicted in the image of the hand. In some embodiments, the keypoints correspond to points of interest on the hand, such as the tip of each finger or the location of joints of each finger. In some embodiments, the keypoints are determined from the hand gesture depicted in the image of the hand by processing the image using a machine learning algorithm such as Google MediaPipe. At step 603, the example method involves transforming the keypoints into a reference control signal. In some embodiments, the reference control signal can be applied to servo motors of the glove device discussed throughout this disclosure to control the rotation of the servo motors with the purpose of imitating the hand gesture depicted in the image of the hand. At step 604, the example method involves associating the keypoints and hand gesture depicted in the image with the reference control signal. At step 605, the example method involves storing the association of the reference control signal, hand gesture, and keypoints in a control signal library. The example method of FIG. 6 can be repeated for different hand gestures such that the control signal library includes a plurality of associations of reference control signals, hand gestures, and keypoints.

Figure 7:
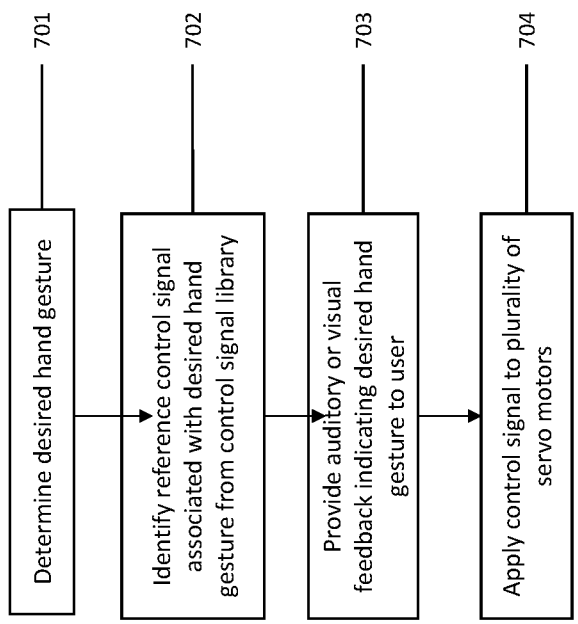
FIG. 7 is an illustration of an example method for teaching a wearer of a glove device how to create a gesture, according to some embodiments.

FIG. 7 illustrates an example method that can be used to teach a wearer a particular gesture. At step 701, the example method involves determining a desired hand gesture. In some embodiments, the desired hand gesture can correspond to a letter or word in sign language. Letters, words, and phrases formed using sign language may collectively be referred to as sign language symbols. At step 702, the example method involves identifying a reference control signal associated with the desired hand gesture from the control signal library. As discussed with reference to FIG. 6, the control signal library includes associations of reference control signals, hand gestures, and keypoints. At step 703, the example method involves providing auditory or visual feedback to the wearer indicating the desired hand gesture. For example, the auditory or visual feedback can explain to the wearer what letter or word will be formed by the glove and their hand. At step 704, the example method involves applying the control signal to servo motors of the glove to rotate the servo motors as discussed throughout this disclosure.

Figure 8:
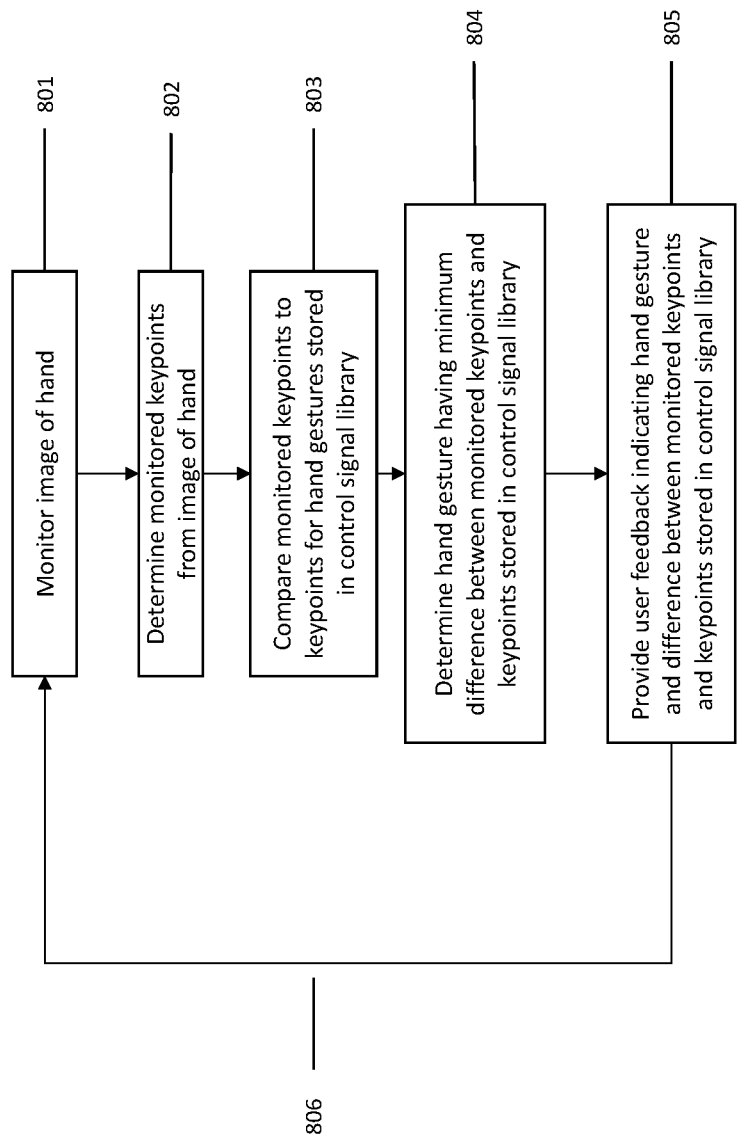
FIG. 8 is an illustration of an example method for assessing a wearer of a glove device, according to some embodiments.

FIG. 8 illustrates an example method that can be used to assess a wearer's proficiency in creating a particular gesture. For example, after the wearer is taught a particular gesture using the example method of FIG. 7, the wearer can continue to practice the gesture. The wearer may want to know how well the wearer is performing the gesture without the assistance of the servo motors controlling the wearer's hand.

At step 801, the example method involves monitoring the image of a hand. Such an image of the hand can be captured with an image capture device, such as a camera capturing still images or video images. At step 802, the example method involves determining monitored keypoints from the image of the hand. Like the example method of FIG. 6, the keypoints correspond to points of interest on the hand and can be determined from the hand gesture depicted in the image of the hand by processing the image using a machine learning algorithm. At step 803, the example method involves comparing the monitored keypoints to keypoints for hand gestures stored in the control signal library. In some embodiments, a difference between the monitored keypoints and keypoints for a hand gesture are determined. At step 804, the example method involves determining a hand gesture having a minimum difference between the monitored keypoints and keypoints stored in the control signal library. At step 805, the example method involves providing feedback to the wearer indicating the most likely hand gesture and the difference between the monitored keypoints and keypoints stored in the control signal library. For example, the example method can determine that the monitored keypoints have a minimum difference with the keypoints associated with the hand gesture corresponding to the letter "A." The example method can then provide auditory or visual feedback to the wearer to inform the wearer that the wearer is likely forming the hand gesture for the letter "A" and, if relevant, the wearer's accuracy in forming the hand gesture. In some embodiments, the method iteratively repeats 806 to continually provide feedback to the user.

In some embodiments, the glove device can be used to teach progressively more complex signs. For example, the glove device can initially be used to teach a user the sign language alphabet while displaying letters on an LCD display, audibly indicating the letters, or displaying letters on an external Braille display. In some embodiments, a variety of interactive checkpoint quizzes can be administered using the feedback process, such as described with respect to FIG. 8, wherein the user performs signs in front of the camera. As the user becomes more comfortable with the alphabet letters, the user can progressively move on to learn more difficult signs, much like a spoken language learning process where simpler words are followed by more complex words. As the user learns each sign, the glove device can spell out a word using sign language alphabet-for example, if the user is learning the word "cat," the glove device can place the user's hands into the "c" sign, then the "a" sign, then the "t" sign, followed by the "cat" sign (in addition to displaying the letters and words on the LCD display or Braille display or, audibly indicating the letters and words). As the user's vocabulary grows, the user can work through increasingly more difficult interactive checkpoint quizzes using the feedback techniques described previously. In some embodiments, software keeps track of the most missed words and phrases to practice those further in future interactive checkpoint quizzes. The learning process can alternate between learning new gestures and quizzes until the user has mastered the desired gestures.

In some embodiments, the techniques described by the embodiments of FIGS. 6-8 are performed by a general purpose computer. In some embodiments, the techniques described by the embodiments of FIGS. 6-8 are performed by a controller or a microcontroller. A person of ordinary skill in the art will understand that any computing device could be used to perform the techniques described by the embodiments of FIGS. 6-8.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method for controlling a wearable glove device, the method comprising:
   receiving an image of a hand;
   determining a plurality of keypoints associated with a hand position depicted in the image of the hand;
   transforming the plurality of keypoints into a reference control signal comprising a signal for a plurality of servo motors and at least one vibration motor;
   associating the reference control signal with the hand position depicted in the image of the hand;
   storing the reference control signal associated with the hand position in a control signal library, the control signal library comprising a plurality of stored reference control signals;
   determining a desired hand position;
   identifying one of the plurality of stored reference control signals from the control signal library which corresponds to the desired hand position;
   applying the one of the plurality of stored reference control signals to the plurality of servo motors to control motion of the wearable glove device; and
   applying the reference control signal to the at least one vibration motor to control vibration of the at least vibration motor.

2. The method of claim 1, wherein the plurality of keypoints are associated with locations of joints of fingers of the hand.

3. The method of claim 2, wherein transforming the plurality of keypoints into a reference control signal comprises determining a desired angle for one or more keypoints for one or more fingers of the hand.

4. The method of claim 3, wherein determining a desired angle for one or more keypoints comprises determining a dot product between a first vector pointing away from the one or more keypoints and a second vector pointing away from the one or more keypoints.

5. The method of claim 4, further comprising determining a total angle for the one or more fingers by summing desired angles for the one or more keypoints.

6. The method of claim 1, wherein applying the reference control signal to the at least one vibration motor to control vibration of the at least vibration motor further comprises applying an increasingly stronger reference control signal as the hand conforms to the desired hand position.

7. The method of claim 6, wherein the increasingly stronger reference control signal causes the vibration motor to increase a vibration frequency.

8. The method of claim 1, further comprising providing auditory feedback identifying the desired hand position to a wearer of the wearable glove device.

9. The method of claim 1, further comprising providing visual feedback identifying the desired hand position to a wearer of the wearable glove device.

10. The method of claim 1, wherein the wearable glove device is controlled to form a sign language symbol.

\* \* \* \* \*